United States Patent [19]
Labell et al.

[11] Patent Number: 6,164,900
[45] Date of Patent: Dec. 26, 2000

[54] SYSTEM AND METHOD FOR PALLETIZING PACKAGES

[75] Inventors: Daniel Labell, New Cumberland; Boris Fridman, York, both of Pa.

[73] Assignee: Westfalia Technologies, Inc., York, Pa.

[21] Appl. No.: 08/921,048

[22] Filed: Aug. 29, 1997

[51] Int. Cl.[7] .................................................. B65G 57/14
[52] U.S. Cl. ..................... 414/792.1; 198/374; 414/793.5
[58] Field of Search .............................. 414/792.1, 793.5; 198/374

[56] References Cited

U.S. PATENT DOCUMENTS

| | | | |
|---|---|---|---|
| Re. 35,066 | 10/1995 | Martin ........................................ | 414/799 |
| 3,245,557 | 4/1966 | Maramonte et al. ................ | 198/374 X |
| 3,442,400 | 5/1969 | Roth et al. ......................... | 414/792.1 X |
| 3,587,876 | 6/1971 | Dahlem et al. ................... | 414/792.1 X |
| 4,024,965 | 5/1977 | Marth et al. ....................... | 414/792.1 X |
| 4,073,387 | 2/1978 | Bowser ............................. | 414/792.1 X |
| 4,132,321 | 1/1979 | Bowlby et al. . | |
| 4,271,755 | 6/1981 | Kintgen et al. ....................... | 414/907 X |
| 4,978,275 | 12/1990 | Reid et al. ........................... | 414/789.5 |
| 5,002,458 | 3/1991 | Moltrasio .............................. | 414/792.1 |

*Primary Examiner*—Janice L. Krizek
*Attorney, Agent, or Firm*—Nixon Peabody LLP; Charles M. Leedom, Jr.

[57] ABSTRACT

A compact, programmable palletizer and method for forming at least one layer of packages on a pallet, comprising a rigid frame, an infeed conveyor positioned adjacent the frame for conveying successive packages into the palletizer, and a rollerbed assembly mounted on the frame and positioned juxtaposed the infeed conveyor for receiving successive packages from the infeed conveyor. The rollerbed assembly is formed on a single horizontal plane and is movable between an advanced position and a retracted position. The palletizer further includes a fixed back stop positioned adjacent the rollerbed assembly and rigidly connected to the frame for preventing the packages conveyed onto the rollerbed assembly from moving beyond a predetermined position thereon, and a sweeper arranged adjacent the rollerbed assembly and the fixed back stop for positioning the package in a predetermined position on the rollerbed assembly by rotating, displacing and squaring the package thereon.

22 Claims, 10 Drawing Sheets

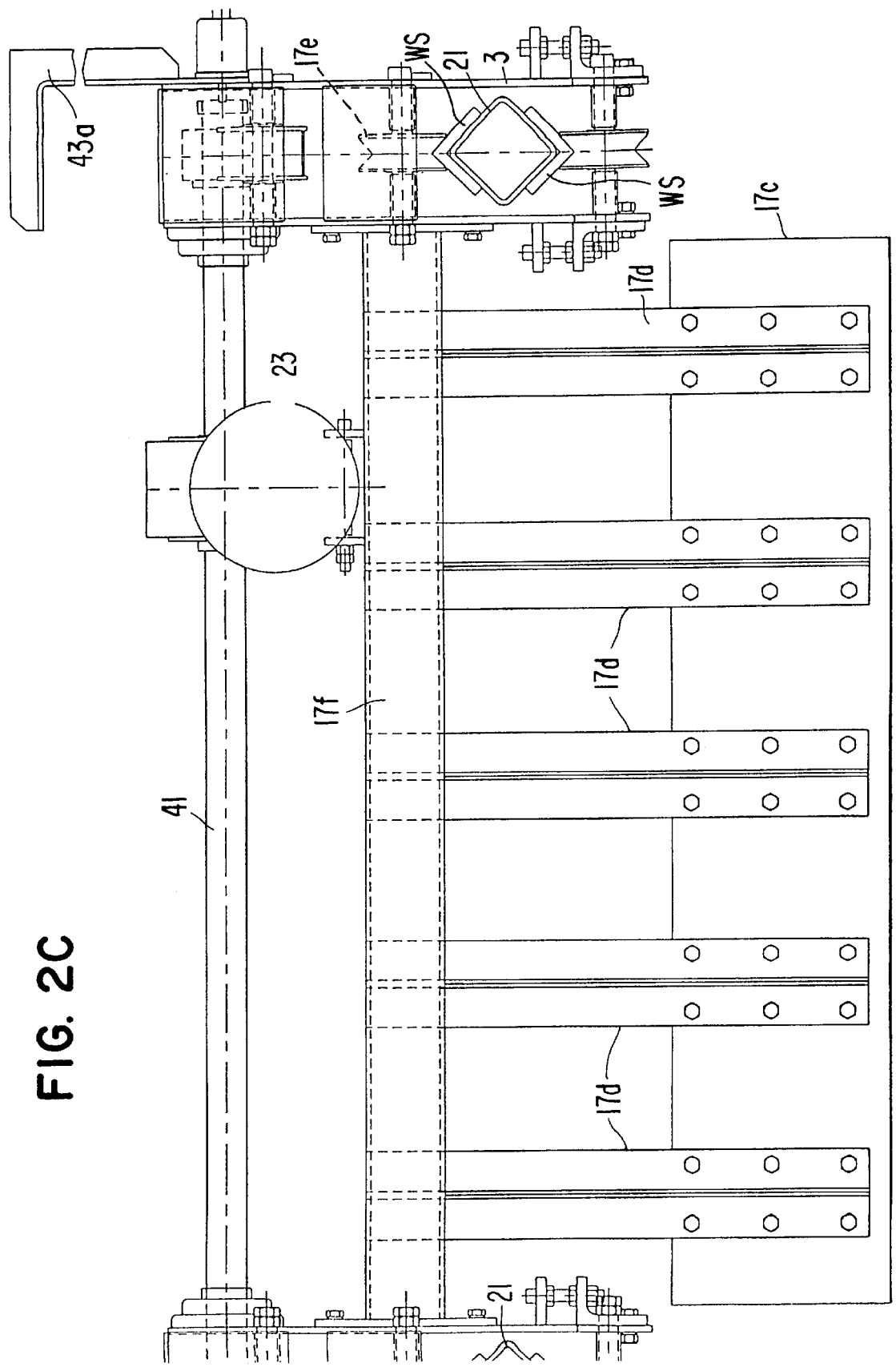

SYSTEM AND METHOD FOR PALLETIZING PACKAGES

TECHNICAL FIELD

This invention is generally directed to the field of palletizing packages and more particularly to a compact, programmable palletizer for receiving, rotating, arranging, squaring and layering packages, such as bagged products, onto a pallet.

BACKGROUND

Numerous palletizers have heretofore been developed for stacking packages (such as bags of powdery, particulate or granular material) or the like on pallets. Generally, the bags are conveyed to the palletizer where they are oriented at a loading area to form a single layer of bags in a desired pattern. The formed layer is then generally squared and transferred to a stripper or separable draw plates for depositing the layer of bags onto an elevated pallet located below the stripper plates and positioned on a pallet elevator. The elevated pallet is then lowered in increments by the pallet elevator as the bags are continuously stacked in layers of alternating patterns until a full pallet load is obtained.

One example of a conventional automated palletizer similar to that described above is provided in U.S. Pat. No. 4,271,755 to Kingten et al. which discloses a bag handling apparatus comprising an infeed conveyor for metering bags entering the apparatus at a controlled rate and a bag turning apparatus which rotates selected bags a predetermined angle to orient the bags in a manner which facilitates the formation of a selected layer pattern on a roller conveyor load table. The layer pattern is then pushed onto a set of stripper plates which are separable to deposit the bag layer onto a pallet which is situated below the stripper plates. After each layer is deposited onto an underlying pallet, the layer is squared and compressed. Once fully loaded, the pallet is subsequently moved and an empty pallet is put in its place to receive a fresh layer of bags. Although Kingten et al. appear to provide an effective system and method for palletizing bags of material, the palletizer of Kingten et al. includes multiple stages, requiring significant floor space to operate. This may be undesirable in a warehouse environment where floor space is scarce. In addition, Kingten et al. uses a large number of components to accomplish the various steps resulting in a relatively high cost palletizing system.

Ideally, a palletizing system that includes components which are multi-functional would be desired in order to reduce the overall size of the palletizer without compromising effective palletizing operations. U.S. Pat. No. 4,132,321 to Bowlby et al. discloses a palletizing system for folded corrugated containers which are stacked onto a stripping plate that subsequently retracts in the direction of a backstop plate to strip the corrugated containers onto a lift or elevator from which the load is moved to an exit conveyor. The Bowlby et al. design does not require a complex arrangement of platforms and rolling devices, however, it is limited to relatively lightweight articles (i.e., corrugated containers). This device would be impractical for palletizing bags or other similar packages since it is not designed to arrange articles in a predetermined pattern or to square a layer of bags before the stripping process. Moreover, the operation of the Bowlby et al. palletizer requires the use of a human operator to physically stack the corrugated containers onto the stripper plate thus, significantly adding to palletizing costs.

In addition to a compact design and multi-functional components, a palletizer that is fully automated is not only desired in the warehousing industry but also necessary to remain competitive in the marketplace. Complete palletizer automation eliminates the costly human operator and allows the palletizer to operate at fast speeds with virtually no errors. U.S. Pat. No. 4,978,275 to Reid et al. discloses a computer controlled article handling device which receives successive groups of articles in a pattern forming area and transfers the groups in succession to a stacking area on a pallet. A servo-controlled sweep system transfers the article groups from the pattern forming area to an adjacent pallet in order to stack one group on top of the other as the pallet is moved downward by a hoist system. A programmable logic controller controls the servo-controlled sweep system in accordance with a velocity characteristic designed to increase machine speed and efficiency. The Reid et al. system offers palletizing automation but at the price of a very complex design that requires a significant amount of space to operate due to its lack of multi-functional components.

U.S. Pat. Reissue No. 35,066 to Martin, discloses an automated palletizer which receives packages in bundles and transports the packages over a series of conveyors to arrange the packages in suitable layers for palletizing in a predetermined form or arrangement. Specifically, the palletizer includes a gate for controlling package flow to the conveyors, a rotator for positioning each package in a required angular position to conform to a selected pattern, a positioner for positioning each package laterally, and a sweeper and stripper plate for transferring the packages onto an elevator platform. The Martin palletizer provides a design that is structurally smaller and has less components than some of the other palletizers discussed above; however, it does not offer the multi-functionality of components that could further reduce the size of the palletizer as well as increase the efficiency of the palletizing operation.

In view of the foregoing, there is still a need for an automated palletizing system that provides multi-functionality of a type designed to achieve effective, pre-programmed palletizing operations while minimizing the size of the palletizer.

SUMMARY OF THE INVENTION

It is an object of the present invention to overcome the deficiencies of the prior art and, in particular, to provide a compact, programmable palletizer for forming one or more layers of packages (e.g. plastic or paper bags containing powdery, particulate, or granular material) on a pallet in an effective and efficient manner.

It is an further object of the present invention to achieve the above object and to provide a compact palletizer that is particularly adapted to stack packages such as plastic or paper bags on pallets in a highly efficient, highly compact area requiring a minimum of factory floor space yet provide a highly automated, versatile palletizer adapter to easily adjust to packages of varying dimensions and weight.

It is a further object of the present invention to achieve one or more of the above objects and to provide a compact, programmable palletizer that utilizes palletizer components for more than one function, resulting in a smaller size, fewer structural components and lower manufacturing costs.

It is another object of the present invention to achieve one or more of the above objects and to provide a compact, programmable palletizer that includes at least one sweeper mechanism for rotating, displacing and/or squaring a package conveyed into the palletizer.

It is also an object of the present invention to achieve one or more of the above objects and to provide a compact, programmable palletizer that includes a support means, such as a rollerbed assembly, for supporting packages conveyed into the palletizer and stripping successive layers of packages onto a pallet for subsequent removal.

It is yet a further object of the present invention to achieve one or more of the above objects and to provide a compact, programmable palletizer that is designed to effectively guide and neatly stack layers of packages onto a pallet using a guiding mechanism positioned adjacent thereto.

It is also another object of the present invention to achieve one or more of the above objects and to provide a method of palletizing packages on a compact, programmable palletizer that yields neatly stacked layers of packages on a pallet in an effective and efficient manner.

It is further an object of the present invention to achieve one or more of the above objects and to provide a method of determining whether a package conveyed onto a palletizer needs to be rotated in order to form a layer of packages having a predetermined pattern.

These and other objects are achieved by a compact, programmable palletizer for forming at least one layer of packages on a pallet, comprising a rigid frame; a infeed conveying means positioned adjacent the frame for conveying successive packages into the palletizer; and a support means mounted on the frame and positioned juxtaposed the infeed conveying means for receiving successive packages from the infeed conveying means, the support means formed on a single horizontal plane and being movable between a first and a second position. The palletizer further includes a fixed back stop means positioned adjacent the support means and rigidly connected to the frame for preventing the package conveyed onto the support means from moving beyond a predetermined position on the support means, and a sweeping means arranged adjacent the support means and the fixed back stop means for positioning the package in a predetermined position on the support means by rotating, displacing and squaring the package on the support means.

The palletizer further includes a drive chain system having a first drive chain and a second drive chain arranged on opposite sides of the rollerbed and positioned adjacent thereto to drive the rollers about their central axes by engaging a corresponding sprocket mounted on each roller. The sprockets for half of the rollers are mounted on alternative roller ends adjacent the first drive chain. The sprockets for the remaining half of rollers are mounted adjacent the second drive chain. This alternative arrangement of drive sprockets allows the sprockets to have a diameter greater than the roller diameter and yet the rollers may be placed relatively close together. The first drive chain drives only one half of the rollers and the second drive chain drives the other half. A rollerbed conveyer also included on the palletizer has a first chain conveyor and a second chain conveyer arranged on opposite sides of the rollerbed assembly and positioned adjacent thereto to displace the rollerbed assembly from a first advanced position to a second retracted position with respect to the fixed back stop means.

A lifting means is positioned below the support means and adjacent the frame for receiving successive packages from the support means when the support means moves from the first position to the second position. A detecting means is positioned adjacent the lift table and support means for detecting the position of the lift table relative to the support means and for causing the lift table to be lowered by the vertical height of each successive layer of packages.

The sweeper positioned adjacent the rollerbed assembly is capable of moving laterally across the rollerbed assembly to engage the package at an off-centered position in order to cause the package to rotate as it is conveyed onto the rollerbed assembly.

A side guiding mechanism, positioned adjacent and below the rollerbed assembly and lift table, is movable from a first position to a second position in order to guide a layer of packages from the rollerbed assembly onto the top layer of packages previously placed on a pallet supported by the underlying lift table to maintain the packages in a predetermined pattern on the pallet and to prevent the entire multilayered stack of packages from shifting position on the pallet.

The objects of the invention are further achieved by a method of palletizing packages comprising the steps of conveying successive packages onto a rollerbed assembly formed in a single horizontal plane; rotating the package a predetermined angle on the rollerbed assembly in order to conform to a predetermined layer pattern; sweeping the package across the rollerbed assembly as necessary to create the predetermined layer pattern; squaring the package on the rollerbed assembly; and retracting the rollerbed assembly toward a fixed back stop in order to strip the layer of packages from the rollerbed assembly onto an underlying pallet supporting device.

The palletizing method of the present invention further includes the step of loading successive packages lengthwise onto an infeed conveyor for conveying the packages successively onto the rollerbed assembly. Each package is spaced from the next and is counted to determine which package should be rotated on the rollerbed assembly in order to arrange a layer of packages in a predetermined pattern, which may include a first set of packages oriented in a first pattern and a second set of packages oriented in a second direction with respect to the rollerbed assembly.

The method of the present invention also includes the step of lifting the pallet supporting device to a predetermined level to receive the stripped layer of packages from the rollerbed assembly. The height of the pallet supporting device is detected after the layer of one or more packages are stripped onto the pallet supporting device and lowered to a predetermined level in order to prevent contact between the layer of one or more packages and the rollerbed assembly when the rollerbed assembly is moved from its retracted position to its initial position. The above steps are repeated until a predetermined number of package layers are formed on the pallet supporting device.

BRIEF DESCRIPTION OF THE DRAWINGS

FIG. 2C shows a partial side elevational view of the sweeper of FIGS. 2A and 2B in accordance with a preferred embodiment of the present invention;

DETAILED DESCRIPTION OF THE PREFERRED EMBODIMENT

The present invention is directed to a compact, programmable palletizer for receiving and arranging packages of a product, such as bags of dry powdery, particulate or granular material e.g. cement, fertilizer, mulch, coal, etc., in a predetermined layer pattern on a pallet for shipment, storage and/or subsequent removal. Products of this type are often placed in plastic bags which present specialized challenges for automated palletizing equipment among which are limited strength characteristics and low frictional surface characteristics. The palletizer of the present invention is specifically designed to operate with bags of this type and with other types of bags such as paper bags.

Figure 1A:
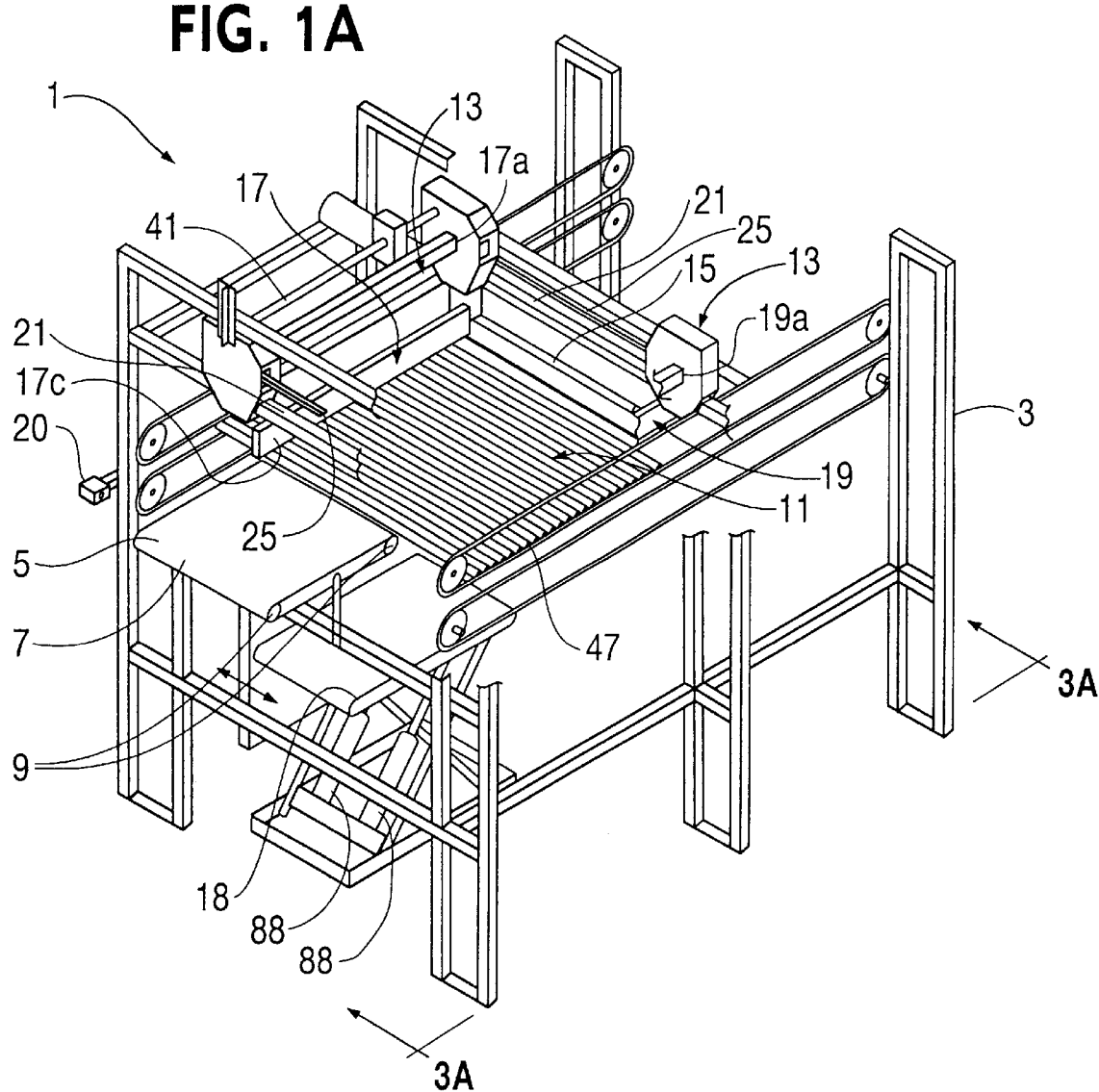
FIG. 1A shows a partially cut away, perspective view of a palletizer in accordance with a preferred embodiment of the present invention.

The palletizer of the preferred embodiment is illustrated in FIG. 1A which offers an isometric, perspective view of the palletizer structure. The palletizer of the preferred embodiment performs multiple functions, using one or more palletizer elements, in order to effectively and efficiently palletize multiple packages. The palletizer performs four major functions to achieve the objectives discussed herein. These functions include (1) conveying successive packages into the palletizer, (2) rotating each package entering the palletizer as necessary to achieve the proper pattern of packages in the layer being formed, (3) sweeping, displacing and/or squaring each package, as necessary, on a rollerbed assembly to form a predetermined package layer arrangement, and (4) stripping the packages onto a pallet in order to form multiple package layers thereon. Each of these functions are discussed in detail herein along with the appropriate structural elements of the palletizer to facilitate the implementation of each respective function. One or more functions described above may only require the use of one particular structural element, thereby providing palletizer multi-functionality of a type designed to achieve effective, pre-programmed palletizing operations in a compact palletizer design.

FIG. 1A illustrates a palletizer 1 having a rigid frame 3 which supports multiple palletizer components. Frame 3 is formed from rigid metal struts, such as hollow stock iron rods, in order to adequately support the palletizer components which Frame 3 suspends critical palletizer components at a predetermined distance from a floor surface which allows sufficient space for pallets to be freely moved into and out of the palletizer area.

Figure 1B:
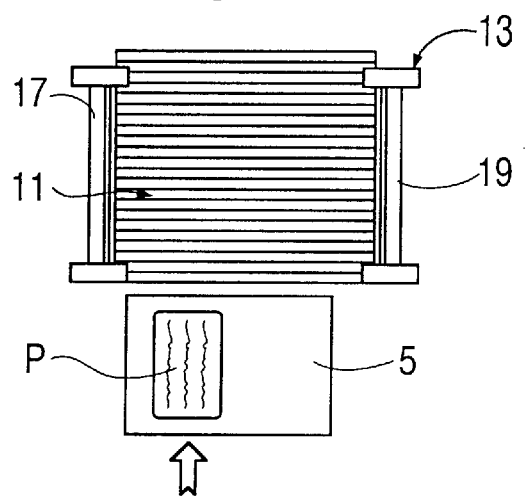
FIG. 1B shows a top, partial view of a package entering the palletizer illustrated in FIG. 1A.

An infeed conveyor 5 is positioned adjacent frame 3 for conveying successive packages into palletizer 1, as illustrated in FIG. 1B. Infeed conveyor 5 may be removably mounted on frame 3, supported by another adjacent structure, or be self-supporting in order to effectively convey packages into palletizer 1. In a preferred embodiment, infeed conveyor 5 is sized to receive successive packages and includes a moveable, endless conveying surface 7 which rotates about at least two rotating spools 9. In an alternative embodiment, the surface area of endless conveying surface may be increased in order to convey multiple packages into palletizer 1 simultaneously.

Endless conveying surface 7 is formed from a material having an adequate coefficient of friction such that packages positioned thereon are conveyed into the palletizer with minimal resistance. Any conveying device may be used to convey packages into palletizer 1 in the manner described herein and, any type of driving device, such as an electric AC motor may be used to drive infeed conveyor 5. The conveying surface may be take a variety of forms, such as a rubber material or rollerbed assembly, provided the successive packages are conveyed into the palletizer 1.

Each package to be palletized is placed onto infeed conveyor 5 lengthwise, one at a time, so that the bags can enter the palletizer in a spaced arrangement. In a preferred embodiment, a photosensor 20 is attached to or positioned adjacent frame 3 and is used to count the packages conveyed into the palletizer. By counting the packages, the palletizer is able to determine whether a sufficient number of packages have entered the palletizer to form a layer. For example, if the palletizer is programmed to form a layer of 5 packages on a pallet, photosensor 20 is used to count each package entering the palletizer until five packages are counted. At this point, the palletizer is programmed to strip the layer of five packages onto a pallet and the counting program is reset to count five more packages. This process is repeated until the pallet has received the predetermined number of package layers.

The conveying function, as described above, is important in ensuring that packages are properly conveyed into palletizer 1 and appropriately counted. As the package is being conveyed into palletizer 1, it is critical to determine whether the package needs to be rotated a predetermined degree in order to achieve a desired package arrangement. As stated above, the packages are typically placed on the infeed conveyor 5 in a lengthwise fashion, since packages of the conventional bag type (which may be either plastic or paper) are normally passed through bag flatteners (not shown), from which packages emerge in a lengthwise orientation. Predetermined layer patterns formed in the palletizer may include a total of five packages, using the above example, wherein two packages are positioned with their longest dimension oriented in the direction received within the palletizer and three packages are rotated 90 degrees to cause their longest dimension to be oriented laterally (transverse) to the incoming direction of the packages conveyed into the palletizer by infeed conveyor 5. In order to ensure that the three horizontally arranged packages are rotated correctly, photosensor 20 is also used to determine which packages should be rotated to obtain the desired package layer arrangement. A description of the structural elements of palletizer 1 which perform the rotating function is provided below.

The compact design of palletizer 1 provides substantial advantages over conventional palletizer designs. In particular, the size of a palletizer can be considerably reduced by allowing multiple palletizer functions to be performed by a single palletizer component assembly. FIG. 1A illustrates the compact design of critical palletizer component assemblies which include a package support means, such as a movable rollerbed assembly 11, a pair of sweeper assemblies 13, and a fixed backstop 15. These particular palletizer elements work in conjunction with one another in order to form a package layer on rollerbed assembly 11 and subsequently function in a unique fashion to strip the formed package layer onto an underlying pallet lift table 18. Sweeper assemblies 13 and rollerbed assembly 11 operate in unison to provide a mechanism for rotating a package entering palletizer 1 whenever necessary, for example 90 degrees, to allow formation of a desired package pattern.

Figure 2A:
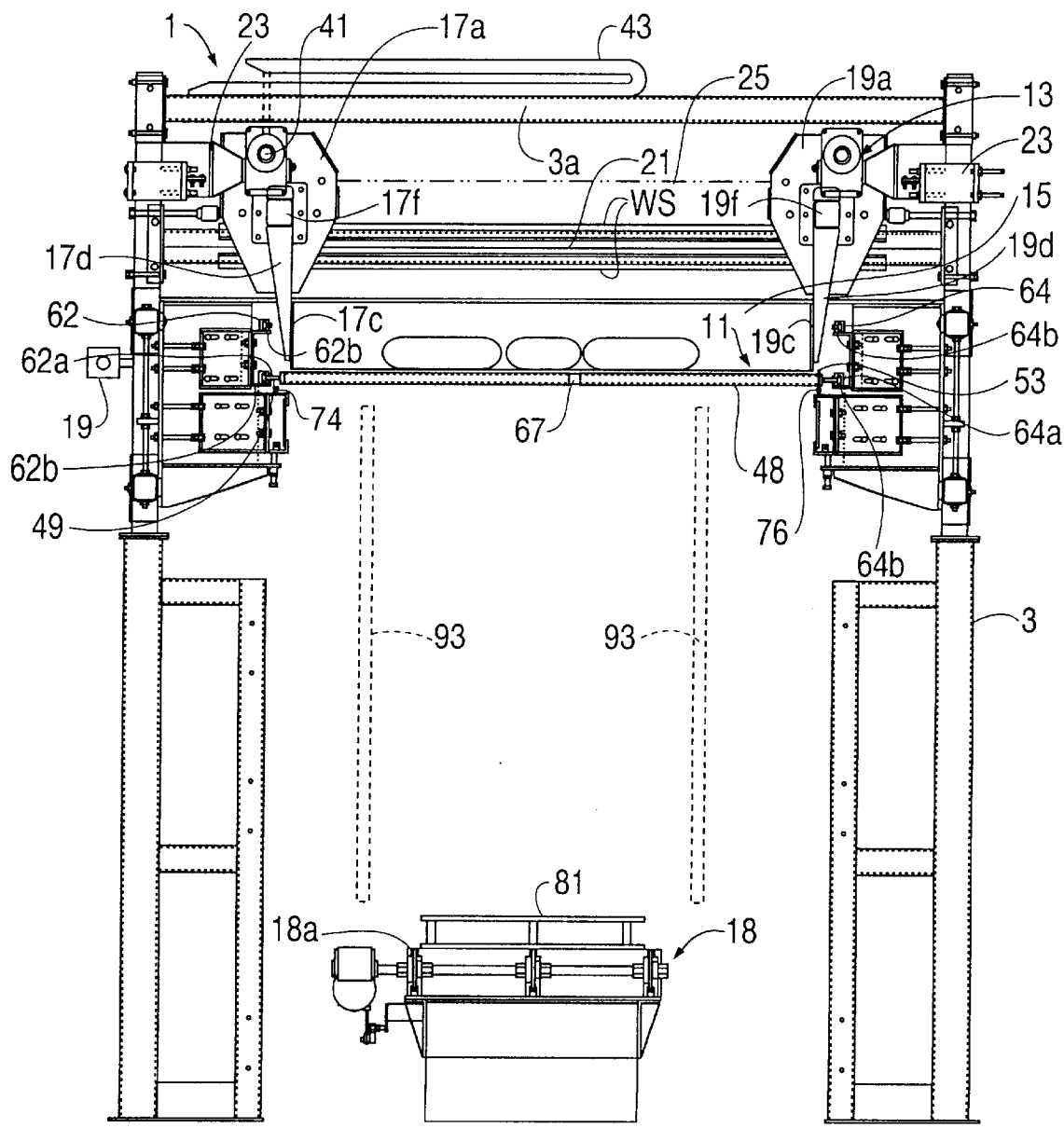
FIG. 2A shows a front elevational view of a palletizer designed in accordance with a preferred embodiment of the present invention.

Sweeper assemblies 13 include a left sweeper assembly 17 and a right sweeper assembly 19 (only partially illustrated in FIG. 1A). Each sweeper assembly includes a sweeper carriage (left sweeper carriage 17a and right sweeper carriage 19a) which operate independently with respect to one another. With reference to FIG. 2A, each sweeper assembly further includes a side plate 17c and 19c mounted on the corresponding sweeper carriages 17a and 19a by arms 17d and 19d which are attached, in turn, to rigid cross bars 17f and 19f, respectively.

Figure 1C:
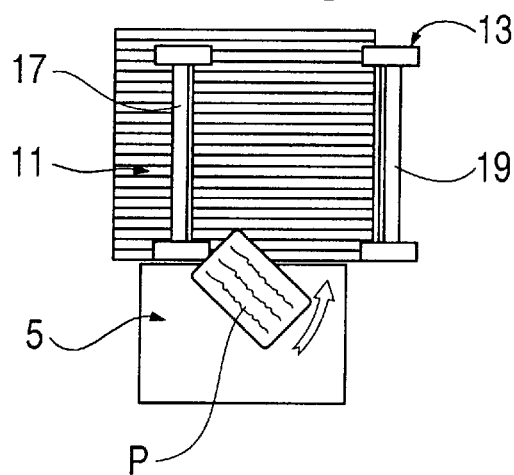
FIG. 1C shows a top, partial view of a package rotating around a sweeper as the package enters the palletizer illustrated in FIG. 1A.
Figure 1D:
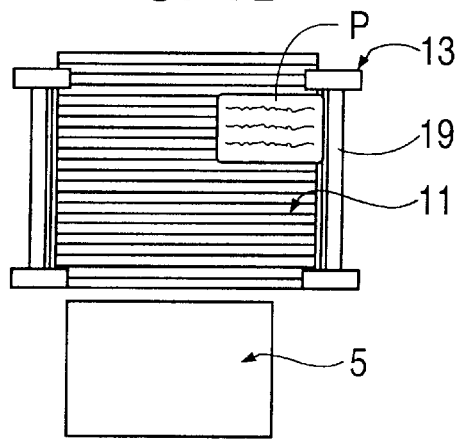
FIG. 1D shows a top, partial view of a package displaced on a rollerbed assembly after the package has been further advanced and shifted to the right by a sweeper of the palletizer illustrated in FIG. 1A.

Palletizer 1 is capable of rotating a package P by displacing left sweeper assembly 17 a predetermined distance in order to engage the package P in an off-centered position while the package is being conveyed into palletizer 1, as illustrated in FIGS. 1B and 1C. Upon engaging left sweeper assembly 17, the package P is forced to rotate around the sweeper assembly approximately 90° and onto the moving rollerbed assembly 11. Upon completion of the desired rotation, the package P is allowed to advance further into the rollerbed assembly 11 as necessary whereupon left sweeper assembly 17 may be activated again to displace the package P laterally on rollerbed assembly 11 in order to form the first component in a desired layer design, as illustrated in FIG. 1D. To this end, left sweeper assembly 17 may sweep the package toward or against right sweeper assembly 19 to move the package P away from other incoming packages. Finally, left sweeper assembly 17 moves back to its original position to engage, if necessary, another package entering palletizer 1. Should the next package not require rotation to form the desired package pattern, left sweeper assembly 17 will be retracted fully to the position illustrated in FIG. 1A to allow the next package to enter into rollerbed assembly 11 without engaging sweeper assembly 17 in a manner to cause rotation.

Left sweeper assembly 17 and right sweeper assembly 19 travel along a pair of parallel rails 21 which are positioned above rollerbed assembly 11 and secured to frame 3, as illustrated in FIGS. 1, 2A, 2C and 3A. Rails 21, as shown in FIGS. 2A and 2C, include an ultra-high molecular weight polyethylene (UHMWP) wear strip WS attached thereto which allows both sweeper assemblies to move along rollerbed assembly 11 with little resistance. One skilled in the art should recognize, however, that any type of rail guiding system may be used to facilitate the movement of the sweeper assemblies.

Figure 2B:
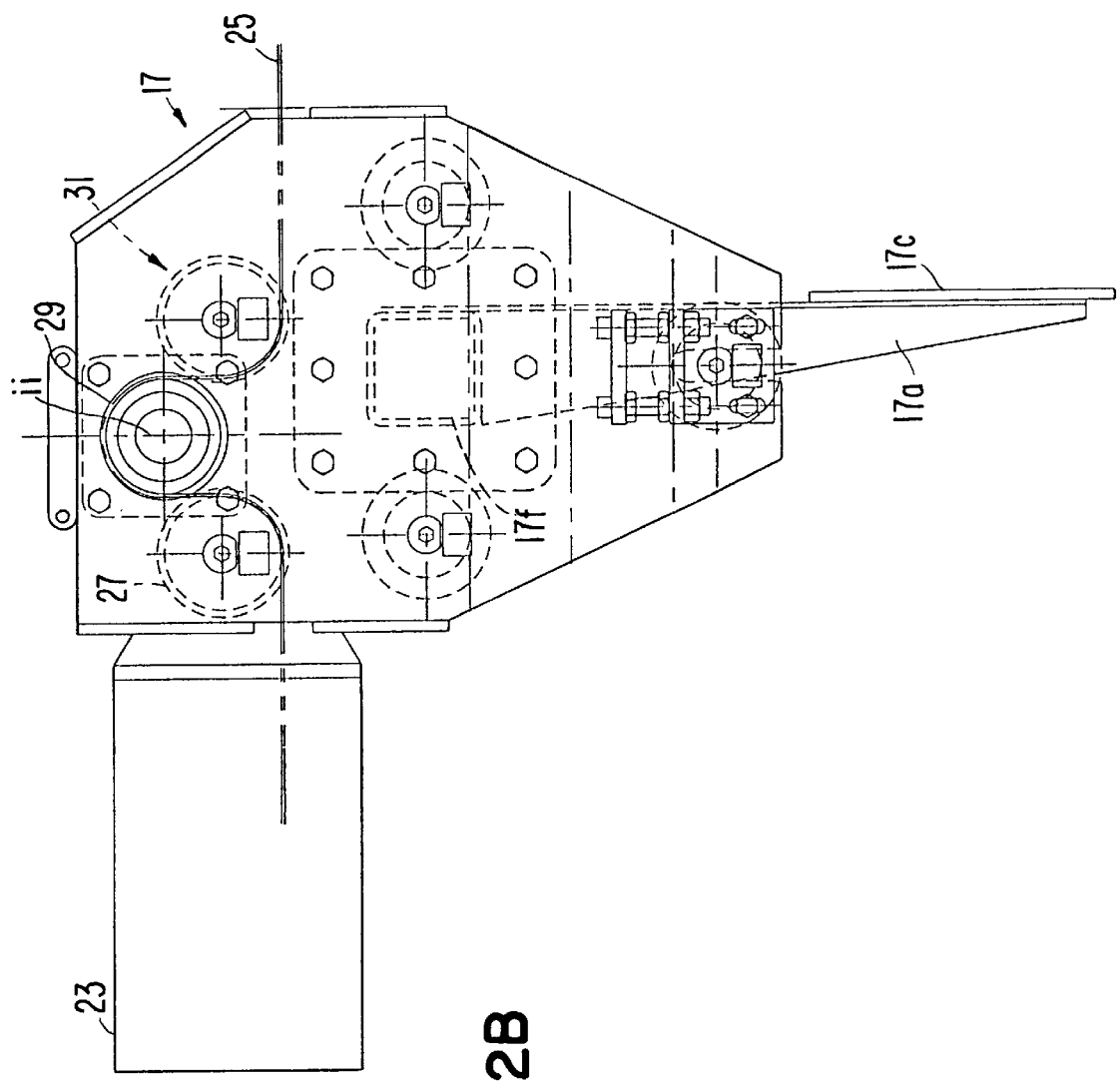
FIG. 2B shows a front transparent view of a sweeper illustrated in FIG. 2A, wherein phantom lines are used to depict the relationship of the sweeper's inner and outer components.

Left sweeper assembly 17 and right sweeper assembly 19 are controlled by a programmable logic controller (not shown) which provides the control data for positioning, during palletizer operation, the corresponding sweeper carriages 17a and 19a. The programmable logic controller controls a pair of sweeper motors 23 for driving sweeper carriages 17a and 19a, respectively, as shown in FIGS. 2A and 2B. Preferably, each sweeper motor 23 is a standard AC motor (or other type motor) driven by a variable frequency drive (VFD) which allows the motor to run at different speeds, depending on the desired positioning of the sweeper assemblies. The VFD would preferably be capable of operating in a "vector drive mode" in which high torque is provided at very low revolutions per minute (e.g. below 10 rpm). By using variable frequency drives, each sweeper motor is able to generate high torque at lower revolutions per minute, thereby, effectively improving the operation of the sweeper assembles at lower speeds.

The palletizing process requires precise and accurate movement of both sweeper assemblies in order to form predetermined package layer patterns as commanded by the programmable logic controller. To achieve this accuracy, each sweeper motor 23 moves the corresponding sweeper assembly via a pair of belts 25 mounted at opposite sides of the sweeper assemblies as illustrated in FIG. 1A. The function of belts 25 can be better understood by considering FIG. 2B wherein one of the two belts 25 is illustrated as it engages a series of rollers 27, 29 and 31 mounted on sweeper carriage 17a. Similar rollers are mounted on sweeper carriage 19a. Both left sweeper assembly 17 and right sweeper assembly 19 run along the same two belts 25 allowing each sweeper assembly to operate in synchronism with the other sweeper assembly. As will be discussed more fully below, roller 29 is driven by motor 23 via a shaft 41 to cause the corresponding sweeper assembly to be advanced and retracted laterally across the rollerbed assembly.

Electrical control cables and connections, which are essential to the operation of the sweeper assemblies, are organized in a cable caddie 43 which is positioned above sweeper assemblies 17 and 19 as illustrated in FIG. 2A. One end of the cable caddie is designed to move laterally in conjunction with both sweeper assemblies in order to prevent any tangling of wires which are used to power and control the sweeper assemblies. In the preferred embodiment one cable caddy is used for each sweeper assembly. The cable caddies are flexible so that they may be smoothly folded down onto corresponding frame members 3a as each sweeper assembly is advanced in one direction and smoothly pulled up from the corresponding frame member 3a when advanced in the opposite direction during palletizing operations. Although only shown schematically by dashed lines in FIG. 2A, one end of caddie 43 is connected to move with sweeper assembly 17 while the opposite end remains fixed to frame 3. Support for the control cables extending between caddies 43 and the corresponding sweeper assemblies is provided by a generally inverted L-shaped bracket 43a shown in FIGS. 2C, 3A.

As illustrated in FIGS. 2B and 2C, left sweeper assembly 17 further includes a series of sweeper arms 17d rigidly attached to sweeper carriage 17a which support a side plate 17c that slightly extends beyond the outer edges of sweeper arms 17d. Right sweeper assembly 19 includes corresponding components 19a, 19c and 19d. Side plates 17c and 19c are positioned directly adjacent rollerbed assembly 11 to allow the sweeper assemblies to effectively engage a package as it is conveyed onto rollerbed assembly 11. The clearance between side plate 17c and rollerbed assembly 11 must be of a distance that prevents a package from sliding therebetween. The side plate of each sweeper assembly work in conjunction with fixed backstop 15 in order to square a package layer to be subsequently stripped onto an underlying pallet. FIGS. 1 and 2A clearly show the structural relationship between fixed backstop 15 and side plates 17c and 19c of sweeper assemblies 17 and 19. Fixed backstop 15 is also positioned to prevent any package conveyed into the palletizer from moving past it.

Figure 3A:
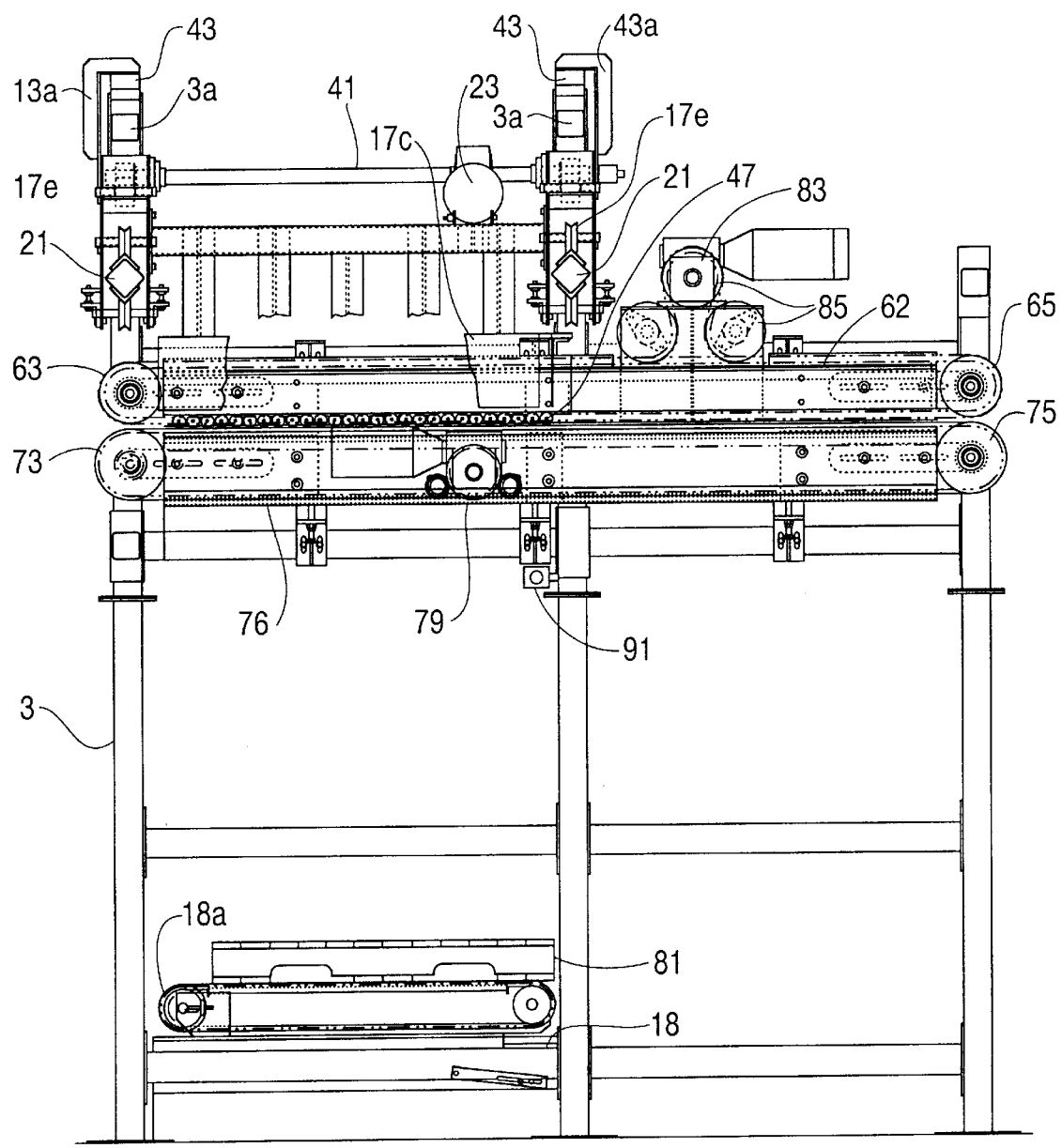
FIG. 3A shows a cross sectional view of a palletizer taken along a vertical plane identified by lines 3A—3A of FIG. 1 wherein the roller assembly is in a first operating position in accordance with a preferred embodiment of the present invention.

FIGS. 2B, 2C and 3A further illustrate that left sweeper assembly 17 includes a drive shaft 41 which extends laterally between parallel rails 21 to transmit motive force from motor 23 to cause left sweeper assembly 17 to move transversely across the rollerbed assembly 11. Essentially, drive shaft 41 provides driving force to each side of the left sweeper carriage 17 to impart driving force equally to each side of the sweeper assembly 17 to cause the sweeper assembly to move evenly across the rollerbed assembly. This driving force may be imparted through appropriate gearing to one or more of the rollers 27, 29 or 31 illustrated in FIG. 2B. In the preferred embodied illustrated in FIG. 2B, the motive force is applied to a pair of rollers 29 (only one of which is illustrated in FIG. 2B) located at each end of drive shaft 41. Each roller 29 is engaged with the pair of belts 25, respectively. As motor 23 turns shaft 41, rollers 29 apply a pulling force on the corresponding belts to move the sweeper assembly in the desired direction. The motive force for right sweeper assembly 19 is provided in an essentially identical manner through corresponding drive motor, drive shaft and rollers. The design of the sweeper assembly illustrated in FIG. 2C is that of the preferred embodiment, however, an alternative sweeping means may be used that provides effective sweeping functionality in accordance with the spirit and scope of the present invention.

A discussion of the conveying and rotating features of palletizer 1 has been set forth above. Another critical feature of palletizer 1 is its ability to displace packages along rollerbed assembly 11 which requires the sweeper assembly described above, operating in cooperation with rollerbed assembly 11. As discussed above, left sweeper assembly 17 and right sweeper assembly 19 are used to displace the packages along the surface of rollerbed assembly 11. However, the design of rollerbed assembly 11 is itself unique, in that it conveys packages into palletizer 1 and facilitates the organization of package patterns thereon. Rollerbed assembly 11 also functions as a stripper to lower packages onto the pallet lift table 18 located beneath the rollerbed assembly.

Figure 3B:
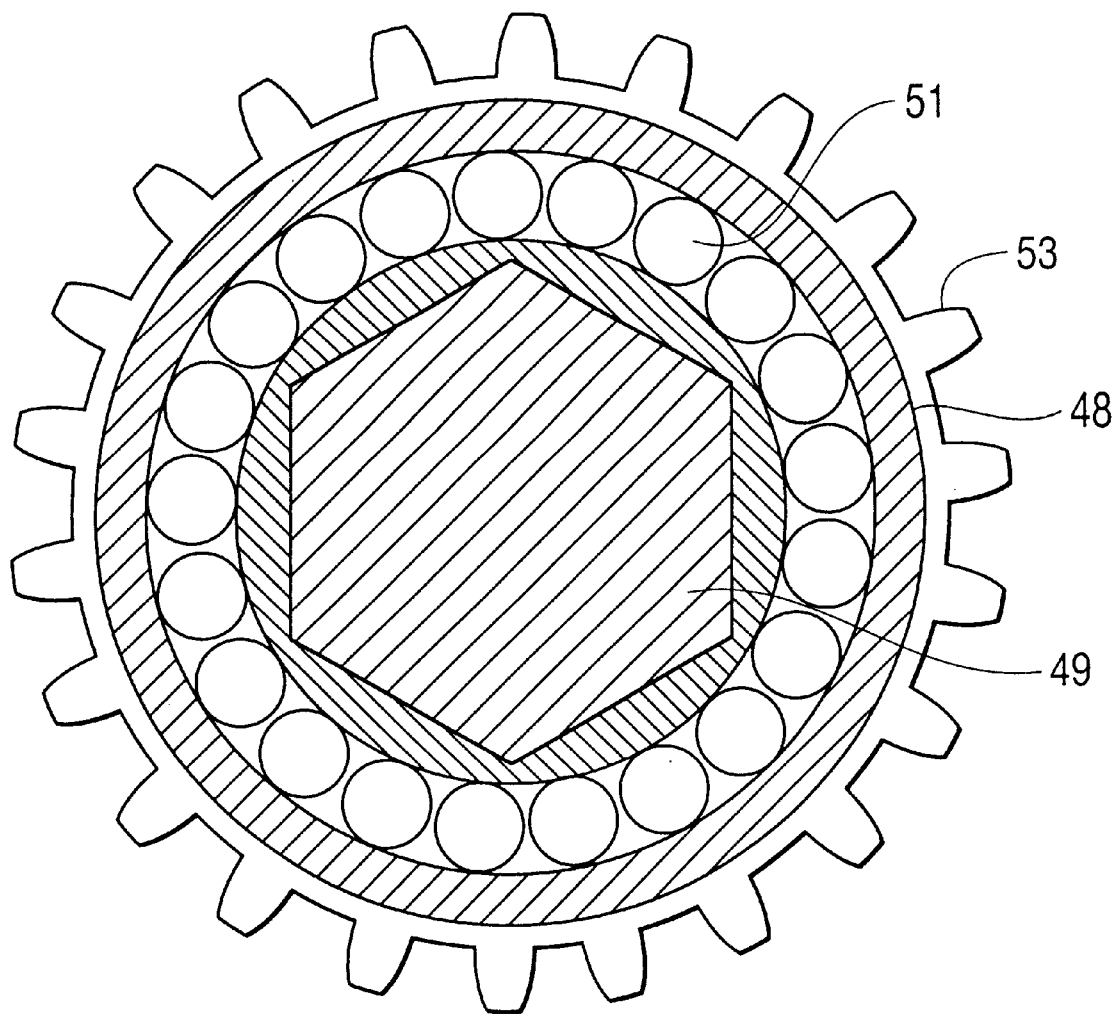
FIG. 3B shows a cross-sectional view of a roller used in the palletizer of FIG. 3A in accordance with a preferred embodiment of the present invention.

As shown in FIG. 3A, rollerbed assembly 11 consists of a plurality of individual rollers 47 which are positioned adjacent one another and formed in a single horizontal plane. Each roller is rotatable about its own central axis and includes a hollow cylindrical tube 48 with a hexagonal shape support rod 49 extending therethrough, as shown in FIG. 3B. A plurality of roller bearings 51 are positioned between hollow cylindrical tube 48 and support rod 49 to allow hollow cylindrical tube 48 to rotate freely around support rod 49. In a preferred embodiment, each roller is supplied with a pair of roller bearings mounted adjacent the ends of the hollow tube 48. About 20–30 rollers are used to form rollerbed assembly 11. The rollers are positioned tightly together in order to prevent packages from sliding between two adjacent rollers.

A bushing 67 is mounted on support rod 49 within each hollow tube 48 to prevent excess deflection of the support rod 49 near the mid section of the hollow tube 48 (see FIG. 2A). The purpose of bushing 67 is to keep each support rod 49 from flexing beyond a predetermined range. Bushing 67 may be composed of ultra-high molecular weight polyethylene to minimize friction between support rod 49 and hollow cylindrical tube 48 at its mid section. In addition, the use of bushing 67 minimizes any noise which may occur due to frictional contact between support rod 49 and hollow cylindrical tube 48 during palletizer operation.

Each hollow cylindrical tube 48 of each roller is rigidly attached to a sprocket 53 as shown in FIG. 3B. Sprocket 53 may be attached to the hollow cylindrical tube 48 by a welding process or other means for securing sprocket 53 thereon. The type of sprocket attachment used in the present invention may vary, in that a sprocket may be attached to the end of a roller, thereby increasing the diameter of the roller, or a sprocket may be effectively attached to the roller in a way that does not increase the diameter of the roller. Regardless of the attachment method, sprocket 53 must have sufficient durability to withstand forces exerted thereon that are sufficient to drive the rollerbed assembly.

A plurality of sprockets 53 are attached to the ends of alternate hollow cylindrical tubes 48 along opposite sides of the rollerbed assembly 11. The sprockets along each side are arranged to engage one of two drive chains 74 and 76 positioned adjacent opposed sides, respectively, of the rollerbed assembly 11. See FIG. 2A. The drive chains 74 and 76 are arranged to tangentially drive alternating rollers 47. For example, for a series of 10 rollers provided in rollerbed assembly 11, first drive chain 74 would tangentially drive the first, third, fifth, seventh, and ninth rollers of the 10-roller assembly and second drive chain 76 would tangentially drive the second, fourth, sixth, eighth and tenth rollers. This unique design allows the rollers to be positioned tightly together while having an adequate driving mechanism to move the packages positioned thereon. Each drive chain may be powered by a standard AC motor. For example, see AC motor 79 arranged to power drive chain 76 as illustrated in FIG. 3A. A similar AC motor will power drive chain 74. Each AC motor will respond to a variable frequency electrical signal as discussed above with respect to the sweeper assembly 13. This standard AC motor 79 is also controlled by the programmable logic controller (not shown).

Rollerbed assembly 11 may be displaced by a rollerbed conveyor including a pair of chain conveyors 62 and 64, as illustrated in FIG. 2A. The chain conveyors 62 and 64 are mounted above rollerbed assembly 11 adjacent the respective sides of the rollerbed assembly 11. The support rods 49 of each roller forming rollerbed assembly 11 extend beyond the ends of the corresponding hollow cylindrical tubes 48 and are received within complementary receiving sockets 62a and 64a formed in the respective chain conveyors 62 and 64. Each of the chain conveyers 62 and 64 is mounted on a pair of sprockets placed just in front of the fully advanced position and just behind the fully retracted position, respectively, of the rollerbed assembly 11. For example chain conveyor 64 (illustrated in FIG. 3C) is mounted on sprockets 63 and 65 as illustrated in FIG. 3A. As best illustrated in FIG. 2A, each of the upper and lower runs of chain conveyors 62 and 64 are supported on support rails 62b and 64b, respectively. Chain conveyor 62 and 64 are adapted to move rollerbed assembly 11 from a first, advanced position to a second, retracted position. FIG. 3A illustrates rollerbed assembly 11 in its first, advanced position while FIG. 3C illustrates rollerbed assembly 11 in its second, retracted position.

In a preferred embodiment, each chain conveyor is a standard, double-pitch chain that is durable enough to support and displace rollerbed assembly 11. One skilled in the art should recognize, however, that other types of chains and chain links may be used in this invention. The hexagonally shaped hole formed in each chain link extends through both sides of the double-pitch chain link, so that each hexagonally shaped support rod is completely suspended by the chain link. The ends of each support rod 49 are secured to corresponding links of chain conveyors 62 and 64, such that, the support rod remains secured under heavy loads and tangential forces during palletizer operation. To this end, support rod 49 may be welded to each chain link or some other type of means may be used to provide an adequate attachment.

Figure 3C:
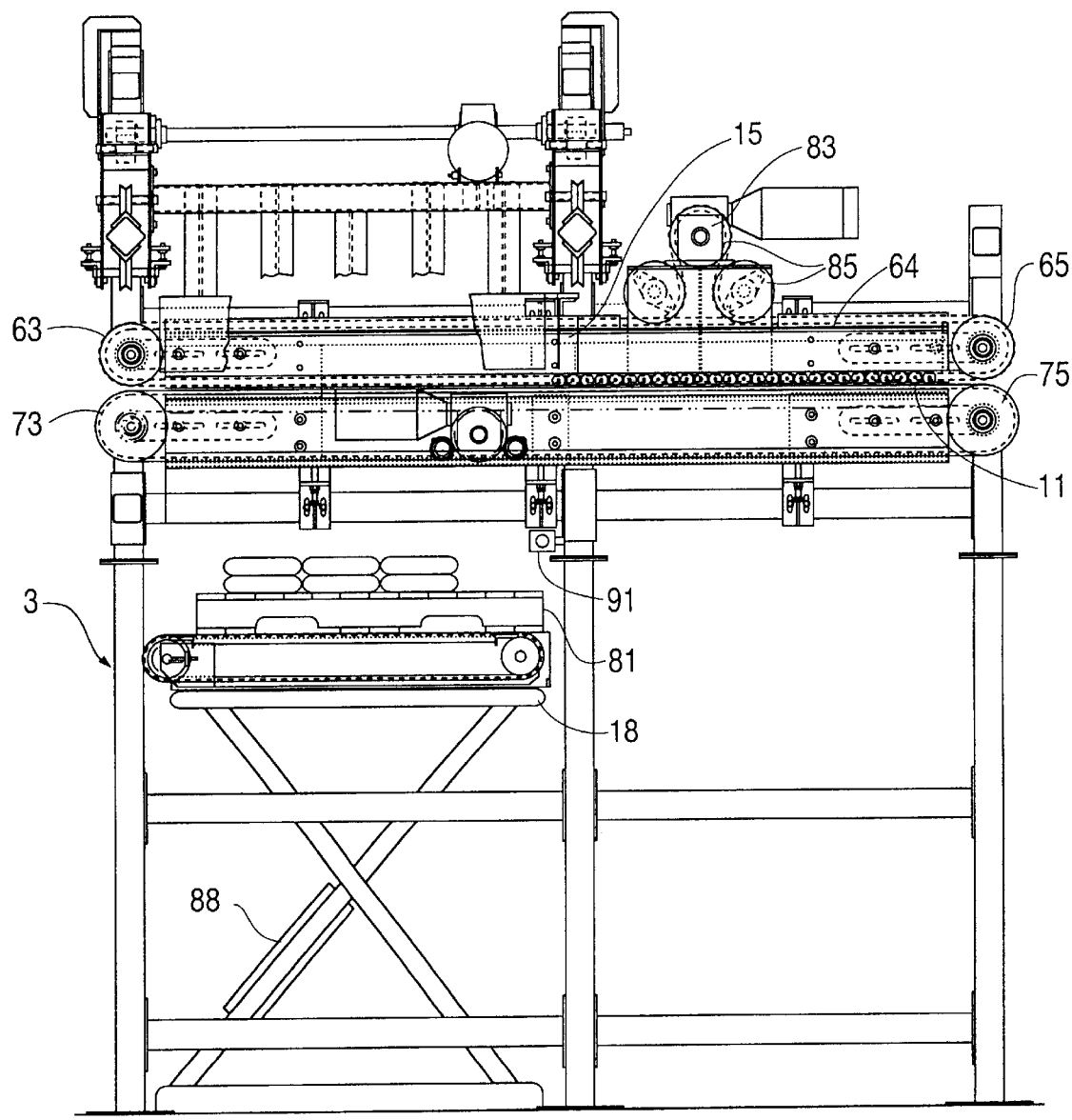
FIG. 3C shows a side elevational view of the palletizer illustrated in FIG. 3A wherein the roller assembly has been retracted to a second operating position in accordance with a preferred embodiment of the present invention.

Once a predetermined layer of packages is formed on rollerbed assembly 11, the programmable logic controller energizes the AC motors to strip the layer of packages from rollerbed assembly 11 onto the underlying pallet 81, as illustrated in FIG. 3C. The stripping function utilizes rollerbed assembly 11 and fixed backstop 15 to displace the packages onto pallet 81. In operation, chain conveyors 62 and 64 are moved to cause the rollerbed assembly 11 to move from its first, advanced position to its second, retracted position. To achieve this, AC motors 83 such as shown in FIGS. 3A and 3C, are used to drive chain conveyors 62 and 64 such that rollerbed assembly 11 moves along a horizontal plane from the first position to the second position. Motor 83 includes a series of motor sprockets 85 around which links of chain 64 are guided when motor 83 is activated. As rollerbed assembly 11 moves from the first position to the second position, fixed backstop 15 prevents the layer of packages from moving therewith. Therefore, the movement of rollerbed assembly 11 from the first position to the second position strips the layer of packages off of rollerbed assembly 11 and onto pallet 81 positioned below.

As best illustrated in FIGS. 2A and 3A, a lift table 18 is provided beneath the rollerbed assembly for supporting pallets on which the packages are to be stacked. The lift table includes a pallet conveyor 18a that is sized to receive pallets up to 54 inches in length and 54 inches in width. The operation of lift table 18 to position pallet 81 for receiving a package layer is an important feature of the present invention. Lift table 18 operates to lift pallet 81 vertically to a position just below rollerbed assembly 11 when the package layer is to be stripped from rollerbed assembly 11. Lift table 18 may be moved between a first, upper position to a second, lower position by using a hydraulic system or other similar mechanical system which facilitates the raising and lowering of pallet 81 in order to effectively receive the layer of packages. In the preferred embodiment, the pallet size may be as large as 54"×54". Consequently, palletizer 1 can handle any size pallet below this size, such as, the standard industry pallet having a dimension of 48"×40". One skilled in the art should recognize, however, that the size of the pallet may changed and the size of palletizer 1 may be similarly adjusted to accommodate changes in the pallet size.

Lift table 18 is also controlled by the programmable logic controller which is discussed in further detail below. Essentially, the programmable logic controller as stated above controls all of the functional elements of palletizer 1. In the preferred embodiment, a hydraulic system is used where an AC motor (not shown) is used to pressurize a pair of hydraulic cylinders 88 of lift table 18, thereby raising the lift table to a desired height. Similar control signals may also be used to lower the lift to a desired height.

The programmable logic controller is designed to produce the control signals necessary to rotate and displace packages as needed to form a layer of packages having a desired pattern. The programmable logic controller includes memory for storing signals representing a plurality of package patterns and controls for allowing operator selection of a desired pattern. The controller further includes processor means for converting an operator selected pattern into control signals for operating the AC motors of each sweeper assembly and rollerbed conveyor to create the selected pattern out of the successive packages.

Palletizer 1 further includes a photo eye sensor 91 (FIG. 3A) which senses the height of lift table 18 to ensure that it is at a proper level to receive the package layer from rollerbed assembly 11. After the layer of packages is stripped onto pallet 81, the pallet is lowered just enough so that rollerbed assembly 11 is able to move back to its original first, advanced position. By maintaining lift table 18 and pallet 81 at this particular height, the pallet will be ready to receive another layer of packages as soon as one is formed on the rollerbed assembly 11 and subsequently stripped as described above. Photo eye sensor 91 ensures that the uppermost layer supported by pallet 81 does not interfere with the movement of rollerbed assembly 11. Sensors may also be positioned on lift table 18 to determine when the lift table is at its uppermost position and also when the lift table is at its lowermost position.

Figure 4:
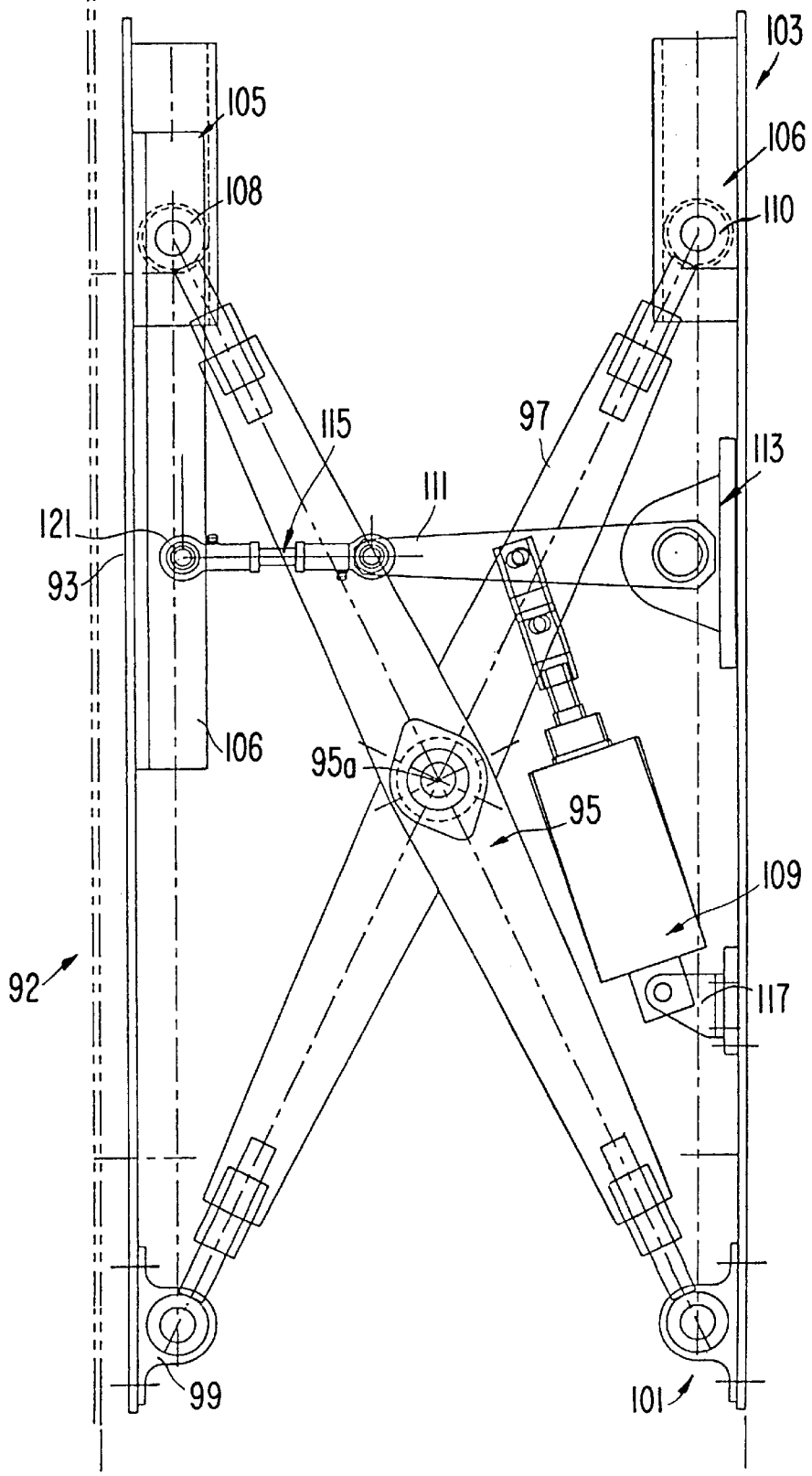
FIG. 4 shows an elevational view of a side guiding mechanism that is positioned adjacent the lift table of the palletizer of FIGS. 1, 2A, 3A and 3B in accordance with an alternative embodiment of the present invention.

FIG. 4 illustrates an alternative embodiment of the present invention. Specifically, this figure shows a side guiding mechanism 92 (also shown partially in dashed lines in FIG. 2A) which is positioned beneath rollerbed assembly 11 and on opposed sides of lift table 18. Side guiding mechanism 92 may be rigidly attached to frame 3 of palletizer 1 and operates to shield a loaded pallet from one or more sides to prevent the packages layered thereon from sliding off. This feature of the present invention is helpful when bags having slippery characteristics are used and layered on an underlying pallet. For example, bags enclosing a graphite or other slippery material may not remain stationary on a pallet and often may slip off of the pallet. The present invention, and more specifically, side guide mechanism 92, ensures that the palletized layers are squared and stay in place until the pallet is completely full. Thereupon, the pallet is removed from the palletizer and a fresh pallet is positioned onto lift table 18 in order to receive a new package load.

In operation, side guiding mechanism 92 extends and retracts between a first and second positions based on predetermined programmable logic controller commands. As shown in FIG. 4, the structure of side guiding mechanism 92 facilitating the above operation includes a plate 93 which acts as the shield for engaging and maintaining the position of bags loaded onto a pallet. In addition, side guiding mechanism 92 includes a pair of elongated arms 95 and 97 which are pivotally connected to each other at their respective centers 95a. Elongated arm 95 is also pivotally connected to a support member 101 which rigidly attaches to a base plate 103. The base plate is rigidly attached to a structural support such as frame 3 of the present invention. Similarly, elongated arm 97 is pivotally attached to a support member 99 which is rigidly attached to guide plate 93.

Elongated arm 95 is movably guided by a guiding rail support 105 for constraining the movement of an end wheel 108 mounted on one end of elongated arm 95 as the guiding mechanism is extended or retracted. Another end wheel 110 is mounted on the end of elongated arm 97 and is also guided in a guiding rail support 106 to cause the end portion of elongated arm 97 to move in a parallel path with the end wheel 108 of elongated arm 95. Because arms 95 and 97 are pivotally connected at 95a, the guide plate 93 is caused to remain in parallel orientation with base plate 103 as it moves toward and away from lifting table 18. Other similar attachments may be connected to the respective end portions of elongated arms 95 and 97 to allow movement within the respective guide rails.

Side guiding mechanism 92 further includes a support arm 111 which extends between guide plate 93 and base plate 103. Support arm 111 is pivotally connected to base plate 103 via a pivot connection 113. In addition, support arm 111 includes an adjusting element 115 which allows the maximum extended distance of guide plate 93 from base plate 103 to be changed. Pivotally connected to support arm 111 is a pneumatic cylinder 109 which extends between the support arm 111 and a pivot connection 117 attached to base plate 103. In the preferred embodiment, a pneumatic cylinder is used to extend or retract side guide mechanism 92 during palletizer operation. One skilled in the art, should recognize that any type of cylinder device may be used to generate a sufficient pressure for retracting and extending side guiding mechanism 92. Pneumatic cylinder 109 is controlled by the programmable logic controller which is programmed to extend or retract side guiding mechanism 92 according to the desired dimensions of the layers of packages to be stacked by the palletizer 1.

In operation, an end portion 121 of support arm 111 moves between a first and second position within a guiding rail support 106. In a fully retracted position, end portion 121 is at the end of guiding rail support 106 which is its furthest distance from pneumatic cylinder 109. Moreover, pneumatic cylinder 109 is at its fully extended position and elongated arms 95 and 97 are in a substantially parallel relationship. To extend side guiding mechanism 92, pneumatic cylinder 109 retracts, thereby pulling support arm 111 towards the pneumatic cylinder and causing support arm 111 to be positioned substantially perpendicular to plates 93 and 103. Support arm 111 serves a very important function when side guiding mechanism 92 is in its fully extended position, namely, support arm allows guide plate 93 to withstand a very substantial amount of pressure without being displaced from its desired position. Support arm 111 thus serves as a locking support arm, thereby preventing external force exerted on guide plate 93 from undesirably displacing side guide mechanism 92 from its operative position.

Figure 5:
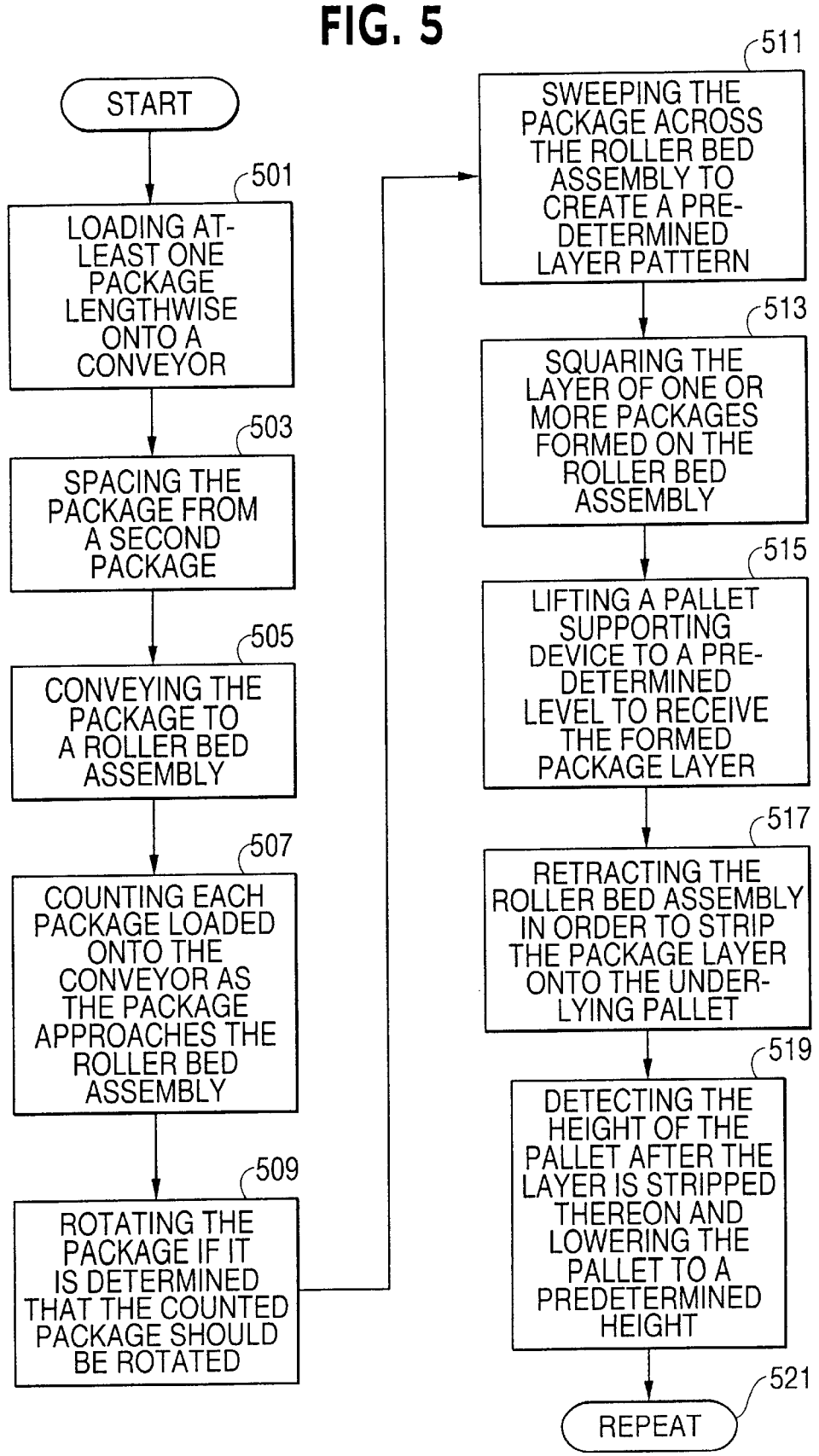
FIG. 5 is a flow chart of one mode of palletizer operation in accordance with a preferred embodiment of the present invention.

The palletizing method of the preferred embodiment is illustrated in FIG. 5. These steps may be programmed into the programmable logic controller (not illustrated) for implementing palletizer operation. The process begins with loading successive packages lengthwise onto infeed conveyor 5, as shown in block 501. Each successive package is placed on the infeed conveyor 5 at spaced apart intervals as shown in block 503. Each package is conveyed toward the rollerbed assembly 11, as noted in block 505. Each package entering the palletizer is counted, as indicated in block 507, and is rotated if the programmable logic controller determines that the package should be rotated in accordance with a programmed stacking arrangement, as provided in block 509. The preprogrammed pattern may be varied in successive layers of packages in order to provide stability to the resulting stack of packages on the stack. After this step, the packages (such as bags) are positioned on the rollerbed assembly and displaced thereon using sweepers to create a predetermined layer pattern, as shown in block 511.

As packages form the predetermined layer pattern on the rollerbed assembly, the layer is squared using the sweepers described above to create a tight layer of packages, as provided in block 513. Prior to and during the initial steps, the pallet supporting device (pallet lift table 18) located directly under the rollerbed assembly is lifted to a predetermined level to receive the package layer, as indicated in block 515. The rollerbed assembly is then retracted, as indicated in block 517, in order to strip the package layer on the underlying pallet. Upon receiving the stripped layer, the height of the upper most layer of packages on the pallet is detected and the pallet is moved to a lower position to keep the upper layer from obstructing the rollerbed assembly as it is moved back to its original position, as provided in block 519. This process is repeated, as shown in block 521, until the pallet is fully loaded. At this time, the pallet is removed from the palletizer and a fresh pallet is put in its place to receive additional new layers of packages.

As described above, the present invention is a compact, programmable palletizer for receiving, rotating, arranging, squaring and layering packages, such as bagged support products, onto a pallet. This automated palletizing system provides multi-functionality of a type designed to achieve effective, preprogrammed palletizing operations while minimizing the size of the palletizer. Multi-functionality is the key to the present invention in that particular palletizer elements may be used for more than one function. This not only allows for a compact design, but also makes the palletizing operation more efficient. In view thereof, palletizer 1 has significant advantages over conventional palletizing designs in that a user can realize more efficient palletizing operation without sacrificing valuable floor space.

Industrial Applicability

The palletizer of this invention has particular utility in stacking plastic and/or paper bags filled with powdered, particulate or granular material that is mass marketed wherein the cost of handling constitutes a substantial cost of the product. Garden materials, such as top soil, mulch, sand, decorative stones and other materials contained in bags, are examples of the type of packages for which the subject palletizer has particular utility.

What is claimed is:

1. A compact, programmable palletizer for forming at least one layer of packages on a pallet in accordance with a predetermined pattern in which each package has a predetermined position, rotationally and laterally, comprising:

a rigid frame;

an infeed conveying means positioned adjacent said frame for conveying packages into the palletizer;

a support means mounted on said rigid frame and positioned juxtaposed said infeed conveying means for receiving the packages from said infeed conveying means, said support means formed on a single horizontal plane and being movable between an advanced position and a retracted position;

a fixed back stop means positioned adjacent said support means and rigidly connected to said frame for preventing the packages conveyed onto said support means from moving beyond a predetermined position on said support means; and a sweeping means arranged adjacent said support means and said fixed back stop means for positioning the package in a predetermined position on said support means by rotating and displacing the package on said support means, said sweeping means being initially moveable laterally across said horizontal plane on which said support means is formed to engage a package at an off-centered position to cause rotation of the package into its predetermined rotational position as it is conveyed onto said support means and being subsequently moveable laterally across said horizontal plane to cause lateral displacement of the package into its predetermined lateral position.

2. The palletizer of claim 1, wherein said infeed conveying means includes an infeed conveyor that is sized to accommodate successive packages and is removable from said frame.

3. The palletizer of claim 1, further including a programmable logic controller and wherein said sweeping means is controlled by said programmable logic controller to rotate and displace packages as needed to form a layer of packages having a desired pattern, said programmable logic having memory for storing signals representing a plurality of package patterns and means for allowing operator selection of a desired pattern and processor means for converting an operator selected pattern into control signals for operating said sweeper means and said support means to create said desired pattern out of the successive packages.

4. The palletizer of claim 1, wherein said sweeping means operates to square the package on said support means.

5. The palletizer of claim 1, wherein said sweeping means includes a sweeper assembly including a movable side plate having a perpendicular orientation with respect to said fixed back stop means for engaging successive packages conveyed onto said support means.

6. The palletizer of claim 5, wherein said sweeper assembly includes a side plate and said frame includes a pair of rails on which said sweeper assembly is mounted for movement across said rollerbed assembly to cause side plate to sweep over said rollerbed assembly to engage and displace as desired any package supported on said rollerbed assembly.

7. The palletizer of claim 6, further including a second sweeper assembly mounted on said pair of rails for movement across said rollerbed assembly, wherein said second sweeper assembly includes a second side plate adapted to sweep over said rollerbed assembly to engage and displace as desired any package supported on said rollerbed assembly.

8. The palletizer of claim 1, further comprising a lifting means positioned below said support means and adjacent said frame for receiving layers of packages from said support means when said support means moves from said advanced position to said retracted position.

9. The palletizer of claim 8, wherein said lifting means includes a lift table that is movable between a first level and a second level.

10. The palletizer of claim 9, wherein said lift table includes a pallet conveyor for advancing pallets into a position on said lift table for receiving layers of packages stripped from said support means.

11. The palletizer of claim 8, wherein a detecting means is positioned adjacent said lift table and said support means for detecting the position of said lift table relative to said support means.

12. The palletizer of claim 1, wherein said support means includes a rollerbed assembly having a plurality of support rollers positioned adjacent one another and formed on a single horizontal plane, and drive means for rotating each of said support rollers.

13. The palletizer of claim 12, wherein said fixed back stop means includes an elongated structure that is positioned parallel to said rollerbed assembly.

14. The palletizer of claim 12, wherein each of said support rollers includes a hollow cylindrical tube and a support rod extending through said hollow cylindrical tube, said hollow cylindrical tube being mounted on said support rod for rotational movement about the central axis of said hollow cylindrical tube.

15. The palletizer of claim 14, wherein said support rod is hexagonal in cross-section.

16. The palletizer of claim 15, wherein a bushing is positioned between said hollow cylindrical tube and said hexagonal shaped support rod at the center of each of said support rollers to minimize the degree of roller flexion.

17. The palletizer of claim 12, wherein each of said support rollers includes a sprocket rigidly attached thereto.

18. The palletizer of claim 17, wherein a plurality of said sprockets are attached to the ends of alternate support rollers, respectively, along one side of said rollerbed assembly and the remaining said sprockets are attached to the ends of the remaining support rollers along an opposed side of said rollerbed assembly.

19. The palletizer of claim 18, further comprising a drive chain system including a first drive chain and a second drive chain arranged on opposite sides of said rollerbed assembly to drive said support rollers about their central axes, wherein said first drive chain drives said alternate support rollers by engaging said sprockets attached to said alternate support rollers and said second drive chain drives said remaining support rollers by engaging said sprockets attached to said remaining support rollers.

20. A compact, programmable palletizer for forming at least one layer of packages on a pallet, comprising:

a rigid frame;

an infeed conveying means positioned adjacent said frame for conveying packages into the palletizer;

a support means mounted on said rigid frame and positioned juxtaposed said infeed conveying means for receiving the packages from said infeed conveying means, said support means formed on a single horizontal plane and being movable between an advanced position and a retracted position;

a fixed back stop means positioned adjacent said support means and rigidly connected to said frame for preventing the packages conveyed onto said support means from moving beyond a predetermined position on said support means; and a sweeping means arranged adjacent said support means and said fixed back stop means for positioning the package in a predetermined position on said support means by rotating and displacing the package on said support means, wherein said support means includes a rollerbed assembly having a plurality of support rollers positioned adjacent one another and formed on a single horizontal plane, and drive means for rotating each of said support rollers, wherein each of said support rollers includes a hollow cylindrical tube and a support rod extending through said hollow cylindrical tube, said hollow cylindrical tube being mounted on said support rod for rotational movement about the central axis of said hollow cylindrical tube, wherein said support rod is hexagonal in cross-section, wherein each of said support rollers includes bearings positioned between said hollow cylindrical tube and said hexagonal shaped support rod.

21. A compact, programmable palletizer for forming at least one layer of packages on a pallet, comprising:

a rigid frame;

an infeed conveying means positioned adjacent said frame for conveying packages into the palletizer;

a support means mounted on said rigid frame and positioned juxtaposed said infeed conveying means for receiving the packages from said infeed conveying means, said support means formed on a single horizontal plane and being movable between an advanced position and a retracted position;

a fixed back stop means positioned adjacent said support means and rigidly connected to said frame for preventing the packages conveyed onto said support means from moving beyond a predetermined position on said support means; and a sweeping means arranged adjacent said support means and said fixed back stop means for positioning the package in a predetermined position on said support means by rotating and displacing the package on said support means, wherein said support means includes a rollerbed assembly having a plurality of support rollers positioned adjacent one another and formed on a single horizontal plane, and drive means for rotating each of said support rollers, further comprising a rollerbed conveyor having a first chain conveyor and a second chain conveyor arranged on opposite sides of said rollerbed assembly and positioned adjacent thereto to support said rollerbed assembly from opposite sides and to move said rollerbed assembly from an advanced position to a retracted position with respect to said fixed back stop means.

22. A compact, programmable palletizer for forming at least one layer of packages on a pallet in accordance with a predetermined pattern in which each package has a predetermined position, rotationally and laterally, comprising:

a rigid frame;

an infeed conveying means positioned adjacent said frame for conveying packages into the palletizer;

a support means mounted on said rigid frame and positioned juxtaposed said infeed conveying means for receiving the packages from said infeed conveying means, said support means formed on a single horizontal plane;

a back stop means positioned adjacent said support means and connected to said frame for preventing the packages conveyed onto said support means from moving beyond a predetermined position on said support means; and a sweeping means arranged adjacent said support means and said back stop means for positioning the package in a predetermined position on said support means by rotating and displacing the package on said support means, said sweeping means being initially moveable laterally across said horizontal plane on which said support means is formed to engage a package at an off-centered position to cause rotation of the package into its predetermined rotational position as it is conveyed onto said support means and being subsequently moveable laterally across said horizontal plane to cause lateral displacement of the package into its predetermined lateral position.

\* \* \* \* \*